United States Patent [19]

Ishikawa

[11] Patent Number: 5,095,475

[45] Date of Patent: Mar. 10, 1992

[54] INFORMATION RECORDING DISK PLAYING APPARATUS

[75] Inventor: Tokiya Ishikawa, Tokorozawa, Japan

[73] Assignee: Pioneer Electronic Corporation, Tokyo, Japan

[21] Appl. No.: 597,709

[22] Filed: Oct. 17, 1990

[30] Foreign Application Priority Data

Oct. 19, 1989 [JP] Japan .................................. 1-272578

[51] Int. Cl.$^5$ .............................................. H04N 5/76
[52] U.S. Cl. ........................................ 369/47; 369/50; 369/59; 350/342
[58] Field of Search ....................... 369/47, 32, 50, 64, 369/59; 358/342, 338, 322, 321, 341; 360/10.1, 73.01, 73.03

[56] References Cited

U.S. PATENT DOCUMENTS 4,761,692  8/1988  Yoshida et al. ........................ 369/47
5,001,570  3/1991  Tagawa ................................ 358/342

Primary Examiner—Roy N. Envall, Jr.
Assistant Examiner—Hung Dang
Attorney, Agent, or Firm—Foley & Lardner

[57] ABSTRACT

An information recorded disk player designed in such a way that spindle servo control is executed on the basis of a sync signal in a video signal while a reading clock for reading memory in a digital demodulation system is synchronized with a reproduced clock, and the low frequency component of a time base error signal is removed from a signal representing the phase difference between these clocks, thereby eliminating the eccentric component and improving the tone quality.

3 Claims, 2 Drawing Sheets

INFORMATION RECORDING DISK PLAYING APPARATUS

BACKGROUND OF THE INVENTION

1. Field of the Invention

The present invention relates to a player for an information recording disk, more particularly, to a player for an information recording disk on which a high frequency FM signal carrying a composite video signal and a low frequency digital signal modulated to carry information have been recorded in a superimposed manner.

2. Description of Background Information

Among this type of information-recording disks, a so-called digital-audio recorded video disk is known wherein a low frequency digital signal which has been produced by digitizing an audio signal by, for example, the EFM (Eight to Fourteen Modulation) method to provide a pulse train signal, is superimposed and recorded on the FM modulated signals of a so-called composite video signal, including sync signals such as horizontal and vertical sync signals, and of an audio signal (see Japanese Patent Application Provisional Publication No. 59-171011.)

In a player which can play this digital-audio recorded video disk, although a video demodulation system and a digital audio demodulation system each have a master clock, a jitter appears in the video output unless information is reproduced in phase synchronization with the master clock of the video demodulation system. Conventionally, therefore the speed control (spindle servo) of a spindle motor that rotationally drives a video disk is executed in accordance with the phase difference between a sync signal in a composite video signal read out from the video disk and in turn demodulated and a reference sync signal, while, in the digital audio demodulation system, a clock is generated in phase synchronization with a reproduction EFM signal phase-locked to a master clock of the video demodulation system and is used as a master clock of the digital audio demodulation system.

According to the conventional apparatus, the master clock of the digital audio demodulation system follows that of the video demodulation system and the spindle servo system intervenes in this phase control loop, so that the eccentric component of a disk is superimposed as disturbance on the master clock of the digital audio demodulation system. This eccentric component has been a cause to deteriorate the tone quality of the digital audio system.

OBJECT AND SUMMARY OF THE INVENTION

It is therefore an object of the present invention to provide an information recorded disk playing apparatus capable of enhancing the tone quality of a digital audio system.

According to the present invention, there is provided an information recording disk playing apparatus comprising: a spindle motor for driving an information recorded disk on which a high frequency FM signal carrying a composite video signal and a low frequency digital signal modulated to carry information datum are recorded, superimposed one on the other; first demodulation means for demodulating the high frequency FM signal read out from the information recorded disk to provide a composite video signal; spindle servo means for controlling a speed of the spindle motor based on a time axis control signal according to a phase difference between a sync signal in the composite video signal and a reference sync signal; second demodulation means for demodulating the low frequency digital signal read out from the information recorded disk; reproduced clock generating means for generating a reproduced clock phase-synchronized with the low frequency digital signal; writing means for writing a demodulated output of the second demodulation means into a memory in synchronism with the reproduced clock; reading clock generating means for generating a reading clock to read the recorded information from the memory; control means for controlling the reading clock generating means based on a phase difference signal according to a phase difference between the reproduced clock and the reading clock; and subtracting means for subtracting the time base error signal caused by an eccentric component from the phase difference signal.

In the information recorded disk playing apparatus according to the present invention, the speed of the spindle motor is controlled on the basis of a time base error signal according to the phase difference between a sync signal in a composite video signal (hereinafter simply called "video signal") and a reference sync signal, while, in the digital audio demodulation system, a reproduced clock is generated in phase synchronism with a reproduced digital signal, a demodulated output being written in a memory in synchronism with this reproduced clock, and a reading clock is generated in synchronism with the reproduced clock, whereby this reading clock generating means is controlled by a signal acquired by subtracting the time base error signal produced by an eccentric component from a phase difference signal corresponding to the phase difference between the reproduced clock and the reading clock, thereby eliminating an influence of the eccentric component of the disk on the reading clock.

DETAILED DESCRIPTION OF THE PREFERRED EMBODIMENT

A preferred embodiment of the present invention will now be described referring to the accompanying drawings.

Figure 1:
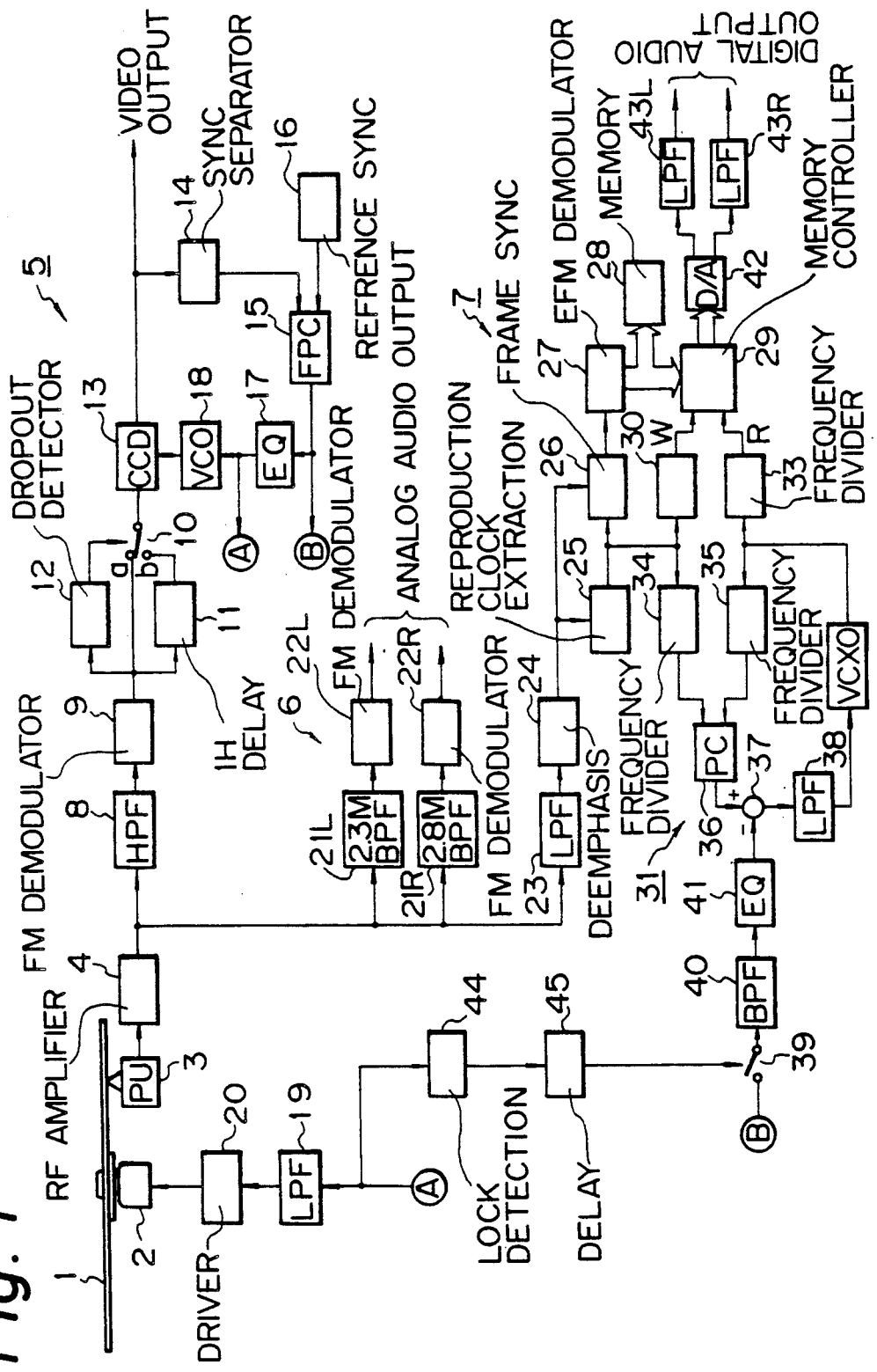
FIG. 1 is a block diagram illustrating one embodiment of an information recorded disk player according to the present invention.

Referring to FIG. 1, numeral 1 shows a digital-audio recorded video disk, which is rotationally driven by a spindle motor 2 and information recorded on the disk is read out by an optical pickup 3. This pickup 3 incorporates, in addition to an optical system including an objective lens, a focus actuator for controlling the position of the objective lens in the direction of the optical axis with respect to the information-recorded surface of the disk 1 and a tracking actuator for controlling the position of an information-reading beam spot in the radial direction of the disk 1 with respect to recording tracks.

The pickup 3 is supported by a carriage (not shown) freely movable in the radial direction of the disk 1. Information read out from the disk 1 by the pickup 3 is supplied through an RF amplifier 4 to a video demodulation system 5, an analog audio demodulation system 6 and a digital audio demodulation system 7.

In the video demodulation system 5, a read RF signal from the disk 1 passes an HPF (High-pass Filter) 8 which extracts only a video information component. This extracted information undergoes FM demodulation in an FM demodulator 9. The demodulated output becomes an input a of a dropout compensation switch 10 and becomes another input b of the switch 10 after having been delayed by 1H (H: horizontal scan period) by a 1H delay circuit 11, and is further supplied to a dropout detector 12 as well. This detector 12 detects a so-called dropout originated from a scratch, dust deposition or the like on the disk 1 based on the demodulated output: the detector 12 may be of a type having a well-known circuit structure. The dropout compensation switch 10 is normally set on the a input side, and is rendered to select the b input during a period of generating the detection output of the dropout detector 12, thereby permitting compensation for dropouts.

The output of the switch 10 is supplied to a variable delay element, for example, a CCD (Charge Coupled Device) 13, to 25 become a video output, and to a sync separator 14 as well. The sync separator 14 separates and extracts, for example, a horizontal sync signal from the video signal, and sends the sync signal to a frequency/phase comparator 15. The comparator 15 produces a time base error signal according to the frequency and phase difference between the horizontal sync signal and a reference sync signal from a reference sync signal generator 16. This error signal is supplied via an equalizer 17 to a VCO (Voltage Controlled Oscillator) 18 to thereby form a time axis servo loop to control the oscillation frequency of the VCO 18. The oscillation output of the VCO 18 is a clock pulse for controlling the amount of delay in the CCD 13. The control of the amount of delay in the CCD 13 by the time base error signal can eliminate a variation in the time base (jitter) caused by the eccentric component or the like of the disk 1. The time base error signal coming through the equalizer 17 is also supplied to an LPF (Low-pass Filter) 19. A low frequency component having passed the LPF 19 is supplied to a spindle driver 20, forming a spindle servo loop to control the speed of the spindle motor 2.

Although the time base servo control and spindle servo control are carried out on the basis of the horizontal sync signal, those control operations may be executed on the basis of a 3.58-MHz color subcarrier included in the video signal. Alternatively, the servo controls may be performed on the basis of both of the sync signal and the subcarrier.

In the analog audio demodulation system 6, 2.3-MHz and 2.8-MHz audio carrier components in the read RF signal from the disk 1 respectively pass BPFs (Band-pass Filters) 21L and 21R. These audio carrier components are subjected to FM demodulation in FM demodulators 22L and 22R at the next stage to become left and right audio outputs. The structure of the digital audio demodulation system 7 will be described below. An EFM signal included together with FM audio information and FM video information in a read RF signal is extracted by the LPF 23 to be supplied to a de-emphasize circuit 24. As superimposing a digital signal as it is on an FM-modulated video signal at the recording time causes the digital signal component to be disturbed by the low frequency component of the FM video signal, the EFM signal has its low frequency component boosted before the recording. At the time of reproducing a signal, therefore, the low frequency component boosted at the recording time is de-emphasized for compensation by the de-emphasize circuit 24. This compensation can improve the S/N ratio of a digital signal to low frequency noise at the time of recording and reproduction.

The read EFM signal having passed the de-emphasize circuit 24 is supplied to a reproduced clock extracting circuit 25 and also to an EFM demodulator 27 via a frame sync detector 26. The reproduced clock extracting circuit 25 comprises a PLL (Phased-locked Loop) circuit which outputs a reproduced clock phase-synchronized with the clock component included in the read EFM signal. The EFM demodulator 27 demodulates the read EFM signal into a PCM digital signal based on this reproduced clock. This demodulated signal is written in a memory 28, such as RAM 15 (Random Access Memory), under the control of a memory controller 29 in synchronism with a writing clock (W clock), which is the output frequency-divided by a frequency divider for the reproduced clock.

Stored information is read out from the memory 28 in synchronism with a reading clock (R clock) which is acquired by frequency-dividing by means of a frequency divider 33 the oscillation output of a VCXO (Voltage Controlled Crystal Oscillator) 32 in a PLL circuit 31. This read-clock generating PLL circuit 31 comprises the mentioned VCXO 32, a phase comparator 36, a subtractor 37 and an LPF 38. The comparator 36 compares the phase of the reproduced clock frequency-divided by a frequency divider 34 with the phase of the output of the VCXO 32 frequency-divided by a frequency divider 35. The subtractor 37 receives the output of the comparator 36 as a minuend input. The LPF 38 receives the low frequency component of the subtracted output of the subtractor 37, as a control voltage for the VCXO 32. The subtractor 37 receives as a subtrahend input an eccentric-originated error component of the time base error signal which is the output of the frequency/phase comparator 15 in the video demodulation system 5. In other words, the time base error signal is supplied to a BPF 40 which selectively passes a frequency component in the vicinity of 10–30 Hz by means of a switch 39, and the eccentric-originated error component of the time base error signal having passed the BPF 40 is subjected by an equalizer 41 to gain adjustment to have a constant amplitude irrespective of a change in frequency and to phase adjustment to have its phase matched with that of the output of the phase comparator 36, becoming the mentioned subtrahend input of the subtractor 37. If the subtractor 37 has an adder structure, the equalizer 41 also serves to invert the phase of the eccentric-originated error component of the time base error signal 180 degrees with respect to the output of the phase comparator 36.

The action of the read-clock generating PLL circuit 31 permits the reading clock for reading stored information from the memory 28 to be phase-synchronized with the reproduced clock. That is, in writing or reading a digital audio information in a reproduction signal into or out of the memory 28 with this reproduction signal in synchronism with the video signal by the aforementioned spindle servo system, the digital audio information is written into the memory 28 in synchronism with the writing clock phase-synchronized with the reproduced clock and is read out from the memory 28 in synchronism with the reading clock phase-synchronized with this writing clock. As the reading speed of the memory 28 is controlled by the output of the PLL circuit 31 which serves to reduce the phase error between the reproduced clock and reading clock, therefore, it is possible to prevent the memory from overflowing or creating a null therein. At this time, the high frequency component of a jitter in the reproduced clock is sufficiently absorbed by the LPF 38 of the PLL circuit 31, permitting the VCO 27 to be controlled by a control voltage that is not affected by the jitter's high frequency component. This allows the reading speed to be controlled by a stable clock.

Figure 2A:
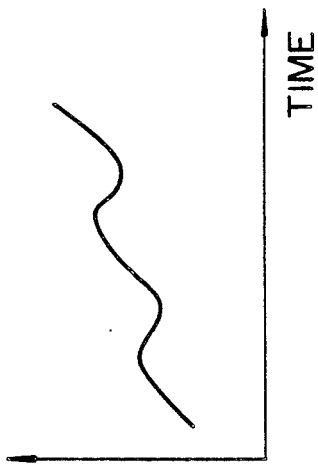
FIGS. 2A and 2B respectively show that the memory writing speed includes the high frequency component of a jitter and the eccentric component of a disk, and that the memory reading speed includes the eccentric component of the disk.
Figure 2B:
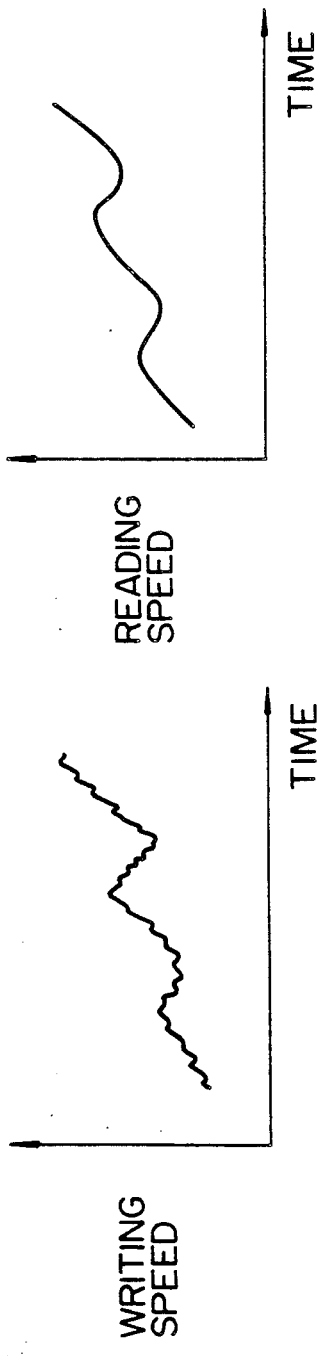

In the digital audio demodulation system 7, as described above, the PLL circuit 31 produces a reading clock that does not follow the high frequency component of a jitter included in the reproduced clock. Since the spindle servo control is executed on the basis of the horizontal sync signal in the video signal, as mentioned earlier, an eccentric component of the disk 1 appears on the reproduced clock phase-synchronized with the read EFM signal. As a result, the eccentric component of the disk also appears on the reading clock, the presence of which will deteriorate the tone quality. FIG. 2A illustrates that the writing speed of the memory 28 includes the high frequency component of a jitter and the eccentric component of the disk 1, and FIG. 2B illustrates that the reading speed of the memory 28 includes the eccentric component of the disk 1. To prevent the reading clock from following the eccentric component of the disk 1, the cutoff frequency of the LPF 38 in the PLL circuit 31 may be set lower. Although the use of an LPF with a low cutoff frequency inhibits the reading clock from following the eccentric component of disk, the response to follow the writing clock becomes slow, losing the phase margin and thus causing the overflow of the memory 28 or generation of a blank portion therein.

Figure 3:
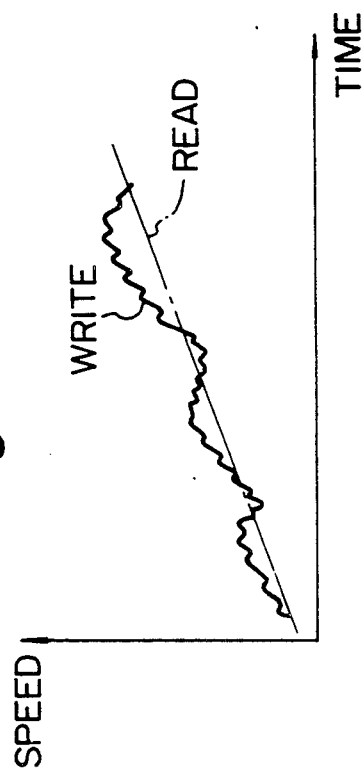
FIG. 3 is a diagram illustrating that the memory reading speed follows the writing speed, free of the influence of the eccentric component of the disk.

According to the present invention, after eccentric-originated time base error signal is eliminated from the output of the phase comparator 36 in the PLL circuit 31, the oscillation frequency of the VCXO 32 is controlled through the LPF 38. Therefore, the reading clock does not follow the eccentric component of the disk 1, but follows only a frequency component even lower than the eccentric component. The speed of reading the memory 28 closely follows the writing speed, as shown in FIG. 3. The digital audio signals read out from the memory 28 by the reading clock, which are produced free of the influence of not only the high frequency of a jitter but also the eccentric component of the disk 1, are converted into analog audio signals by a D/A (Digital/Analog) converter 42. The analog audio signals then become right and left audio outputs through a pair of LPF 43R and LPF 43L.

The switch 39, which selectively permits the time base error signal to be the subtrahend input of the subtractor 37 through LPF 40 and equalizer 41, is rendered on (closed) by the output of a delay circuit 45 that delays, by a predetermined time, the output of a lock detector 44 for detecting the locked state of the spindle servo based on the time base error signal having passed the equalizer 17. In other words, the low frequency component of the time base error signal will be eliminated from the output of the phase comparator 36 in the PLL circuit 31 only when the spindle servo is locked. This happens because when the spindle servo system is in servo-led in state to cause disturbance in the system immediately after special reproduction, such as scanning, the PLL circuit 31 of the digital audio demodulation system 7 has not yet reached the normal state. Removing the low frequency component of the time base error signal from the output of the phase comparator 36 under this condition therefore may hinder the loop-leading of the PLL circuit 31.

Although the description of this embodiment has been given with reference to a case of playing a digital-audio recorded video disk, the disk player of the present invention can also play ordinary video disks having no digital audio recorded.

Digital signals to be recorded on a digital-audio recorded video disk are not restricted to the above-described type including audio information, but may include digitized image information or control information for a computer. As described already, according to the information recorded disk playing apparatus of the present invention, the speed of the spindle motor is controlled on the basis of a time base error signal according to the phase difference between a sync signal in a video signal and a reference sync signal, while, in the digital audio demodulation system, a reproduced clock is generated in phase synchronism with a reproduced digital signal, a demodulated output being written in a memory in synchronism with this reproduced clock, and a reading clock is generated in synchronism with the reproduced clock, whereby this reading clock generating means is controlled by a signal acquired by subtracting the time base error signal caused by an eccentric component from a phase difference signal according to the phase difference between the reproduced clock and the reading clock, thereby eliminating an influence of the eccentric component of the disk on the reading clock. This structure of the present invention can enhance the tone quality of the digital audio system.

What is claimed is:

1. An information recorded disk player comprising:

a spindle motor for driving an information recorded disk on which a high frequency FM signal carrying a composite video signal and a low frequency digital signal modulated to carry information datum have been recorded, superimposed one on the other;

a pickup for reading out the high frequency FM signal and the low frequency digital signal from the information recorded disk;

first demodulation means for demodulating the high frequency FM signal which was read out from the information recorded disk to provide a composite video signal;

spindle servo means for controlling a speed of the spindle motor based on a time base error signal according to a phase difference between a sync signal in the composite video signal and a reference sync signal;

second demodulation means for demodulating the low frequency digital signal read out from the information recorded disk;

reproduced clock generating means for generating a reproduced clock phase-synchronized with the low frequency digital signal;

write means for writing a demodulated output of the second demodulation means into a memory in synchronism with the reproduced clock;

reading clock generating means for generating a reading clock to read recorded information from the memory;

control means for controlling the reading clock generating means based on a phase difference signal according to a phase difference between the reproduced clock and the reading clock; and subtracting means for subtracting the time base error signal, caused by an eccentric component, from the phase difference signal.

2. An information recorded disk player according to claim 1, wherein the subtracting means subtracts a low frequency component of the time base error signal from the phase difference signal only where the spindle servo is located.

3. A digital information demodulating system for demodulating a reproduced digital signal, said digital information demodulating system comprising:

means for generating a reproduced digital signal containing digital information;

demodulating means for demodulating said digital information of said reproduced digital signal and for producing a demodulation signal;

memory means for storing said demodulation signal;

writing means for writing the demodulation signal into said memory means in accordance with a reproduced clock;

reproduced clock generating means for generating said reproduced clock from said digital information;

reading clock generating means for generating a reading clock for reading out stored information from said memory means;

phase control means for phase-controlling said reading clock from said reading clock generating means in accordance with a phase difference signal representing a phase difference between said reading clock and said reproduced clock, wherein stored information is read out from said memory means in synchronism with said reading clock; and subtracting mean for subtracting a time base error signal, caused by an eccentric component, from said phase difference signal.

* * * * *